(12) United States Patent
Meyer et al.

(10) Patent No.: US 7,740,448 B2
(45) Date of Patent: Jun. 22, 2010

(54) PITCH CONTROL BATTERY BACKUP METHODS AND SYSTEM

(75) Inventors: Brian Nedward Meyer, Fairview, PA (US); Jeffrey Alan Melius, Roanoke, VA (US); Cyrus David Harbourt, Roanoke, VA (US); Christopher L. Tschappatt, Roanoke, VA (US); Howard Ross Edmunds, Roanoke, VA (US); William John Bonneau, East Troy, WI (US); Amy Marlene Ridenour, Salem, VA (US); Andrew Scott Wilkinson, Pittsburgh, PA (US)

(73) Assignee: General Electric Company, Schenectady, NY (US)

( * ) Notice: Subject to any disclaimer, the term of this patent is extended or adjusted under 35 U.S.C. 154(b) by 1257 days.

(21) Appl. No.: 11/223,473

(22) Filed: Sep. 9, 2005

(65) Prior Publication Data

US 2007/0057516 A1    Mar. 15, 2007

(51) Int. Cl.
*B63H 3/06* (2006.01)

(52) U.S. Cl. ............................ 416/1; 416/27

(58) Field of Classification Search .................. 416/1, 416/27; 290/44, 55
See application file for complete search history.

(56) References Cited

U.S. PATENT DOCUMENTS

| | | | |
|---|---|---|---|
| 4,719,550 A | 1/1988 | Powell et al. | |
| 5,255,175 A | 10/1993 | Uchino | |
| 5,907,192 A | 5/1999 | Lyons et al. | |
| 6,122,181 A * | 9/2000 | Oughton, Jr. | 363/37 |
| 6,583,523 B1 | 6/2003 | Bhate | |
| 6,600,240 B2 | 7/2003 | Mikhail et al. | |
| 6,771,903 B1 | 8/2004 | Cousineau | |
| 6,847,128 B2 | 1/2005 | Mikhail et al. | |
| 6,853,094 B2 | 2/2005 | Feddersen et al. | |
| 6,856,039 B2 | 2/2005 | Mikhail et al. | |
| 6,856,040 B2 | 2/2005 | Feddersen et al. | |
| 6,856,041 B2 | 2/2005 | Siebenthaler et al. | |
| 6,921,985 B2 | 7/2005 | Janssen et al. | |
| 6,933,625 B2 | 8/2005 | Feddersen et al. | |
| 6,951,443 B1 | 10/2005 | Blakemore | |
| 7,004,724 B2 | 2/2006 | Pierce et al. | |

(Continued)

FOREIGN PATENT DOCUMENTS

DE    40 07 350 A1    9/1999

(Continued)

OTHER PUBLICATIONS

European search report from the European Patent Office.

*Primary Examiner*—Edward Look
*Assistant Examiner*—Aaron R Eastman
(74) *Attorney, Agent, or Firm*—James McGinness, Esq.; Armstrong Teasdale LLP (57) ABSTRACT

A method for controlling a pitch control system of a wind turbine includes providing a charged backup battery configured to supply no energy to a DC link when full AC input power is available, wherein the DC link includes a DC link capacitor. The method further includes using energy stored in the DC link capacitor to operate a pitch control system during a loss or dip of AC input power, and maintaining charge on the DC link capacitor using the charged backup battery as voltage across the DC link capacitor drops during the operation of the pitch control system.

20 Claims, 8 Drawing Sheets

U.S. PATENT DOCUMENTS

| | | | |
|---|---|---|---|
| 7,015,595 B2 | 3/2006 | Feddersen et al. | |
| 7,071,579 B2 * | 7/2006 | Erdman et al. | 290/55 |
| 7,126,236 B2 * | 10/2006 | Harbourt et al. | 290/44 |
| 2003/0151259 A1 | 8/2003 | Feddersen et al. | |
| 2004/0022642 A1 | 2/2004 | Niethammer | |
| 2004/0217594 A1 | 11/2004 | Feddersen et al. | |
| 2004/0217595 A1 | 11/2004 | Feddersen et al. | |
| 2004/0217596 A1 | 11/2004 | Feddersen et al. | |
| 2006/0163882 A1 * | 7/2006 | Brandt | 290/44 |

FOREIGN PATENT DOCUMENTS

| | | | |
|---|---|---|---|
| WO | WO 2005/017350 | * | 2/2005 |
| WO | WO 2005/017350 A | | 2/2005 |

* cited by examiner

PITCH CONTROL BATTERY BACKUP METHODS AND SYSTEM

BACKGROUND OF THE INVENTION

This invention relates generally to wind turbine energy systems and more particularly to pitch control systems for wind turbines.

In one known wind turbine, a pitch control system having a fully regenerative silicon controlled rectifier (SCR) bridge drives a 4.2 KW series DC motor. This type of system has been used in servo motor drives for many years and is commercially available. The SCR drive has the advantage of simplicity, but may not be able to deliver the level of pitch system performance that may be needed in newer and/or larger wind turbines.

In the event of a loss of AC input power, at least one known wind turbine system pitches the blades of the wind turbine using emergency pitch batteries. The blades are pitched to a position that would prevent blade overspeed. The AC voltage drop is sensed by the pitch control system and the emergency pitch system is activated. The wind turbine control system modulates the emergency pitch system and attempts to keep the hub rotational speed below overspeed limits. In many cases, the turbine control issues a fault and stops the turbine. However, known wind turbine systems use DC link capacitors and an H bridge power converter circuit, and do not have the ability to pitch the blades using this circuit once the small amount of energy stored in the DC link capacitors is depleted.

BRIEF DESCRIPTION OF THE INVENTION

One aspect of the present invention therefore provides a method for controlling a pitch control system of a wind turbine. The method includes providing a charged backup battery configured to supply no energy to a DC link when full AC input power is available, wherein the DC link includes a DC link capacitor. The method further includes using energy stored in the DC link capacitor to operate a pitch control system during a loss or dip of AC input power, and maintaining charge on the DC link capacitor using the charged backup battery as voltage across the DC link capacitor drops during the operation of the pitch control system.

In another aspect, the present invention provides an apparatus for controlling pitch of a blade of a wind turbine. The apparatus includes a pitch control system and a DC link having a DC link capacitor. The DC link is configured to provide power to the pitch control system. Also included is a source of AC input power to provide power to the DC link, and a backup battery configured to supply no energy to the DC link when full AC input power is available. The apparatus is configured to use energy stored in the DC link capacitor to operate the pitch control system during a loss or dip of AC input power, and maintain charge on the DC link capacitor using the backup battery as voltage across the DC link capacitor drops during the operation of the pitch control system.

In yet another aspect, the present invention provides a wind turbine that includes at least one blade and a generator coupled to the blade and configured to generate AC power. The wind turbine further includes a pitch control system configured to control a pitch of the blade about an axis, a DC link having a DC link capacitor and configured to provide power to the pitch control system, and a source of AC input power to provide power to the DC link. The source of AC power is not necessarily the generator. The wind turbine also includes a backup battery configured to supply no energy to the DC link when full AC input power is available. The wind turbine is configured to use energy stored in the DC link capacitor to operate the pitch control system during a loss or dip of AC input power, and maintain charge on the DC link capacitor using the backup battery as voltage across the DC link capacitor drops during the operation of the pitch control system.

Configurations of the present invention are thus able to provide battery supported operation of pitch control motor drives, which increases the availability of the wind turbine by allowing operation through grid disturbances.

DETAILED DESCRIPTION OF THE INVENTION

In some configurations of the present invention, a single wind turbine pitch control design has cost and performance advantages over known systems. A single wind turbine motor drive is provided with a non-regenerative bridge supplying a DC voltage to an H bridge that comprises four active switching devices (e.g., paralleled MOSFETs in some configurations). A DC link capacitor smooths the DC link voltage and acts as an energy sink and source for the series DC motor. This design also includes an emergency pitch system using batteries and contactors to pitch the blades to a featured position.

Figure 1:
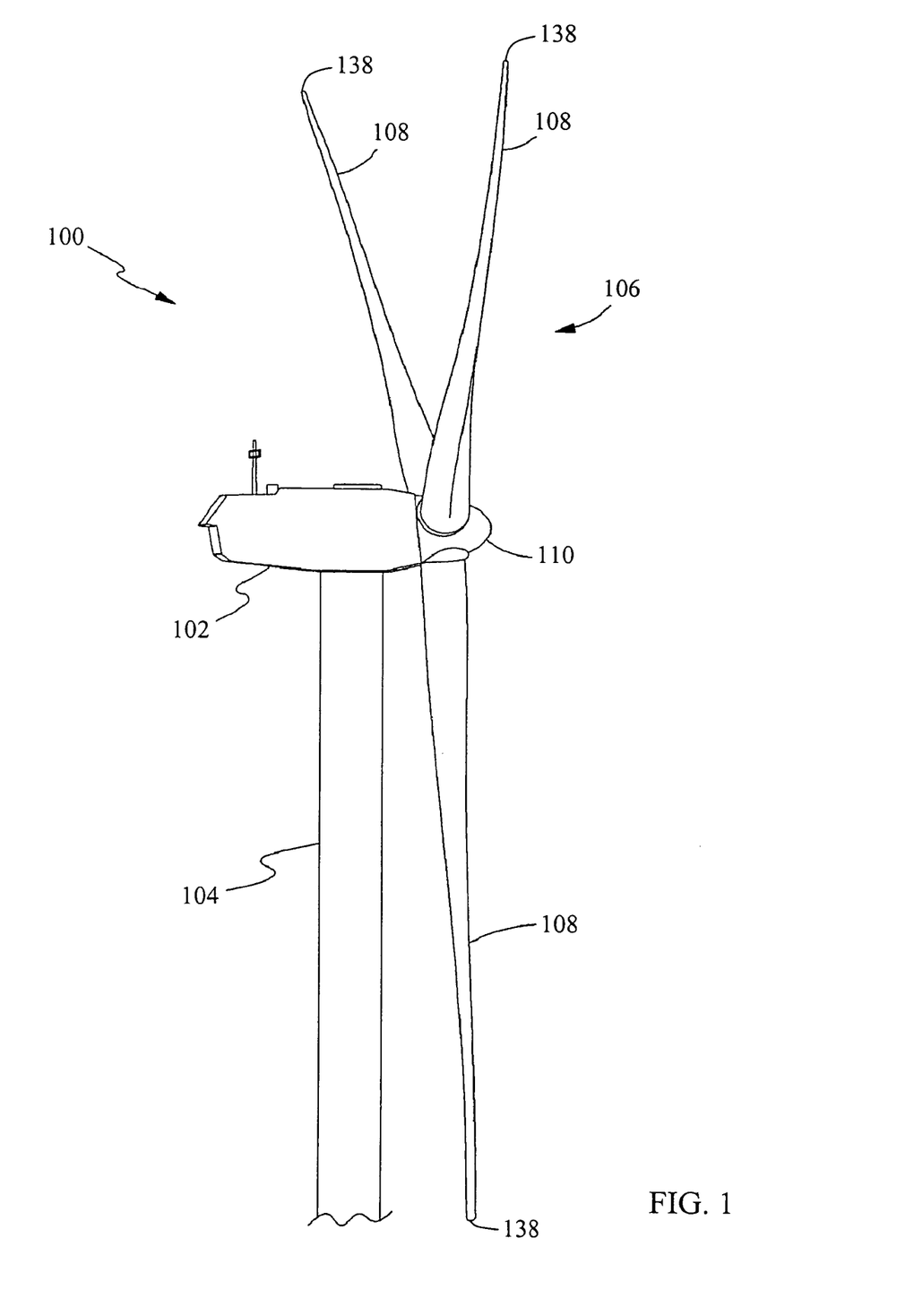
FIG. 1 is a drawing of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
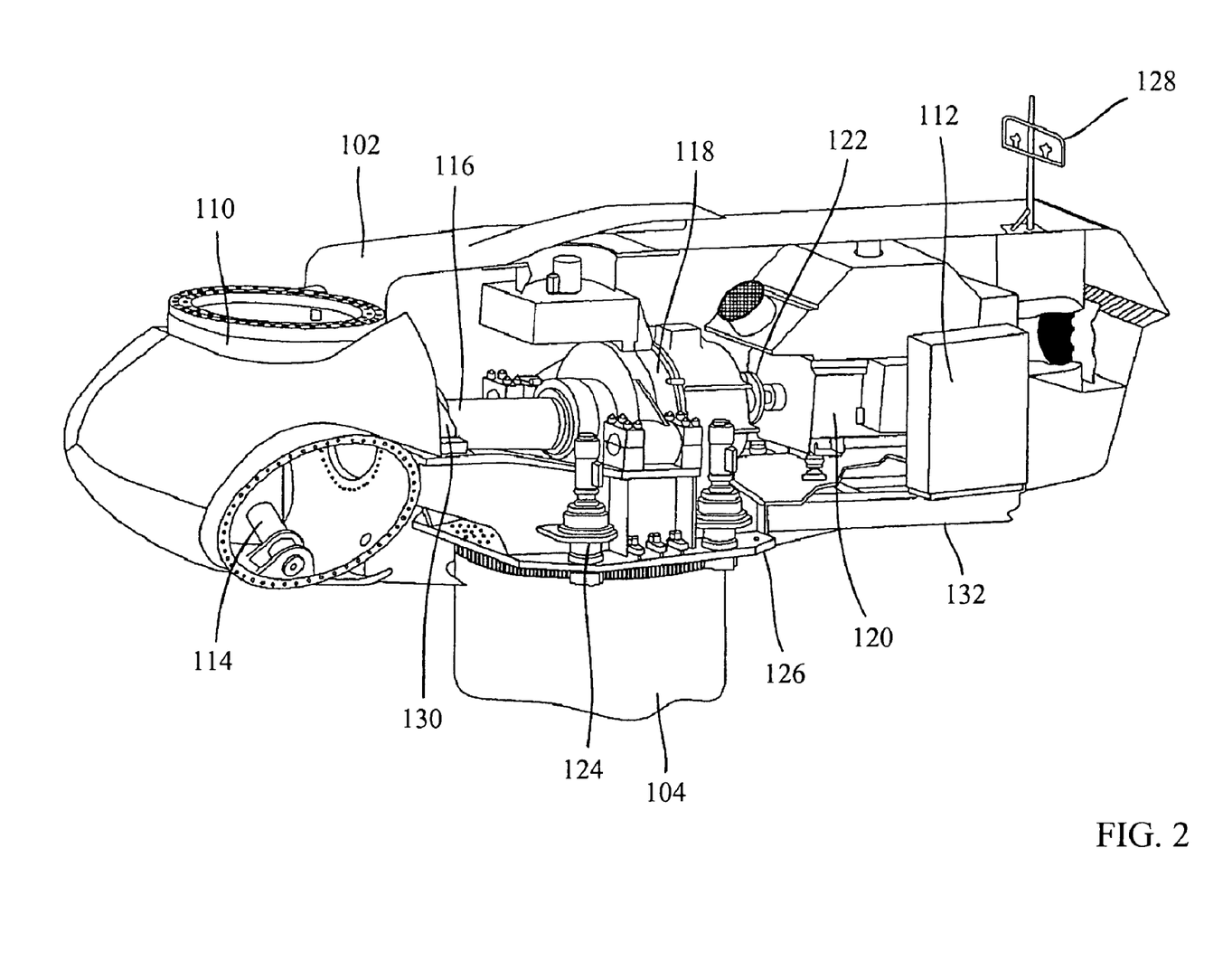
FIG. 2 is a cut-away perspective view of a nacelle of the exemplary wind turbine configuration shown in FIG. 1.

Referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 to control the pitch of blades 108 (not shown in FIG. 2) that drive hub 110 as a result of wind. In the illustrated configuration, hub 110 receives three blades 108, but other configurations can utilize any number of blades. In some configurations, the pitches of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 and supported by a main bearing 130 and, at an opposite end of shaft 116, to a gear box 118. Gear box 118, in some configurations, utilizes a dual path geometry to drive an enclosed high speed shaft. The high speed shaft (not shown in FIG. 2) is used to drive generator 120, which is mounted on main frame 132. In some configurations, rotor torque is transmitted via coupling 122. Generator 120 may be of any suitable type, for example, a wound rotor induction generator.

Yaw drive 124 and yaw deck 126 provide a yaw orientation system for wind turbine 100. Wind vane 128 provides information for the yaw orientation system, including measured instantaneous wind direction and wind speed at the wind turbine. In some configurations, the yaw system is mounted on a flange provided atop tower 104.

Figure 3:
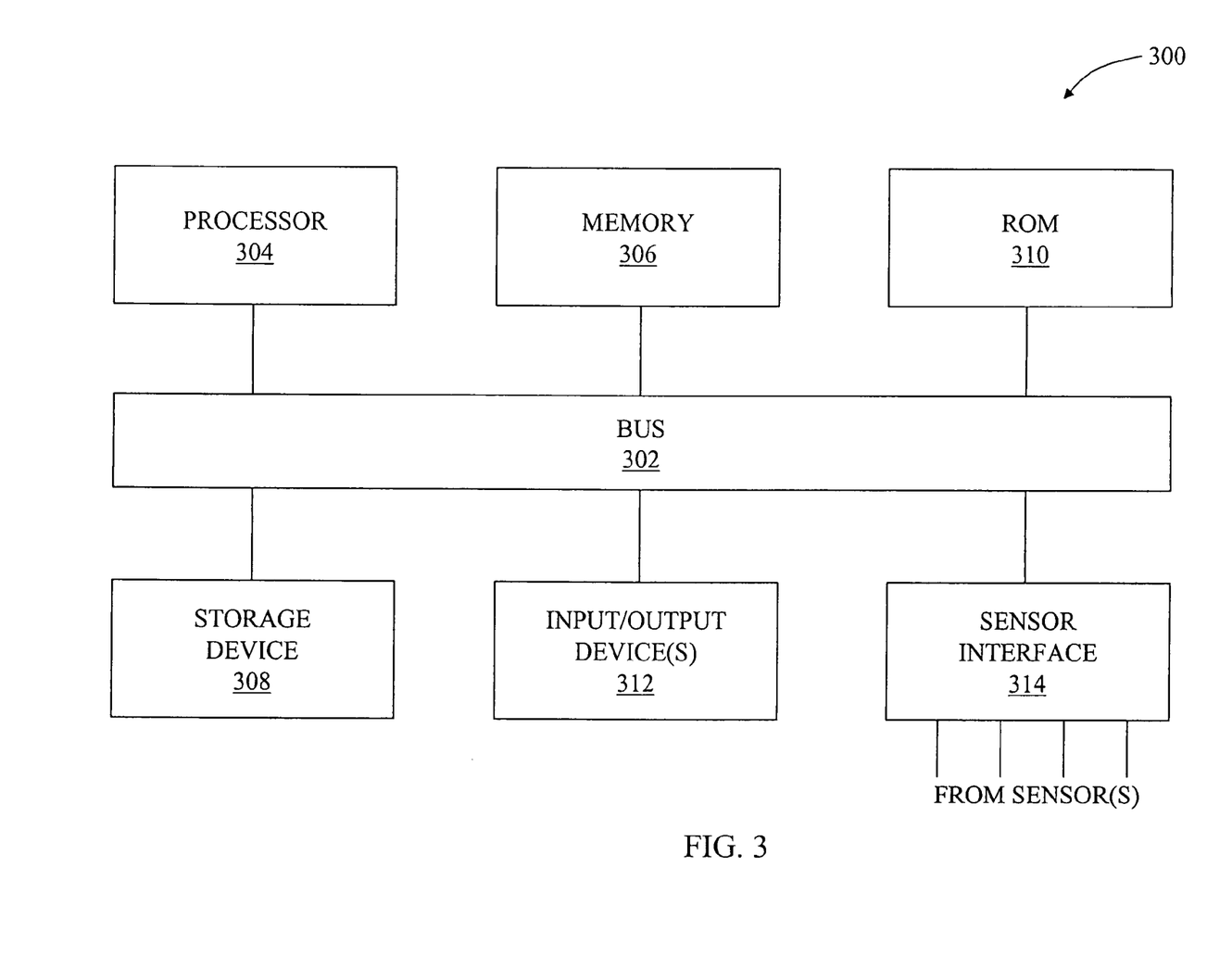
FIG. 3 is a block diagram of a configuration of a control system for the wind turbine configuration shown in FIG. 1.

In some configurations and referring to FIG. 3, a control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

Figure 4:
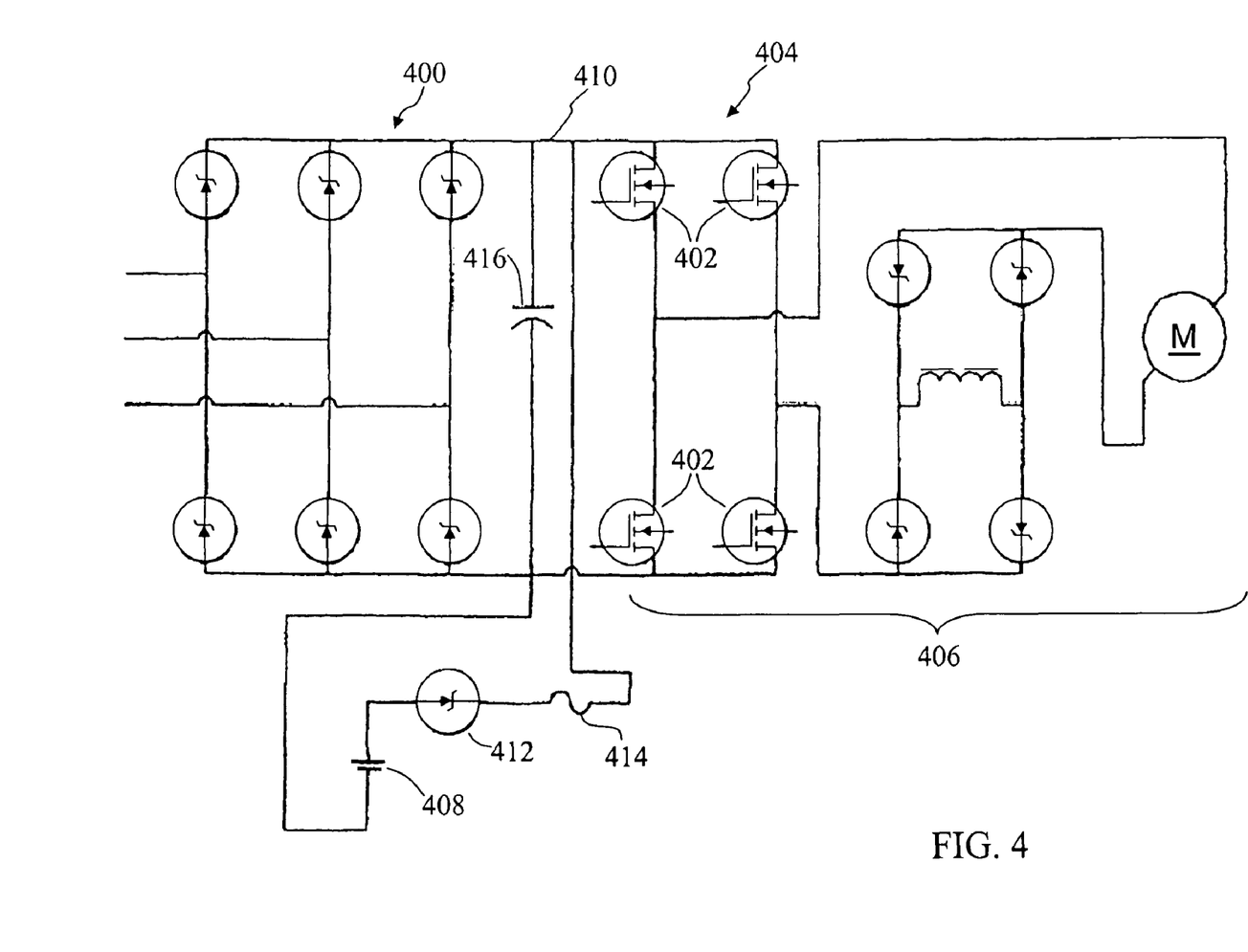
FIG. 4 is a block schematic diagram representative of some configurations of the present invention for controlling a pitch control system of a wind turbine.

In some configurations of the present invention and referring to FIG. 4, in the event of a loss of AC input power from a source 400 and to prevent turbine overspeed, blades are pitched using a MOSFET 402 based power converter 404. Power converter 404 comprises part of a pitch control system 406. (For notational convenience, as used herein, AC input source 400 refers to a rectifier bridge or an IGBT or MOSFET bridge. It is understood that this bridge is intended to be electrified by a generator, a power line, a power grid, or some other source of AC power, which may or may not comprise generator 120.) A backup battery 408 is provided to allow pitching of blades 108 (shown in FIG. 1) in the event of AC input power loss or a power dip. Battery 408 (which can comprise one or more electrical cells or a plurality of multi-cell batteries, or any combination thereof) is connected to DC link 410 of through a diode 412 and a fuse 414. Under normal conditions, diode 412 is reverse biased and no current flow occurs from battery 408 to DC link 410. In this condition, battery 408 is charged and its condition monitored, but it supplies no energy to DC link 410.

When the DC link 410 voltage dips to below the voltage of battery 408, current flows out of battery 408 through diode 412 and fuse 414 to maintain charge on DC link capacitor 416. Diode 412 prevents uncontrolled charging of battery 408 when the DC link voltage is higher than the battery voltage. Fuse 414 prevents damage to battery 408 in the event of a short circuit on DC link 410. Backup battery 408 of DC link 410 allows pitch control system 406 to maintain active control of blade 108 position throughout an AC power loss or dip event.

Figure 5A:
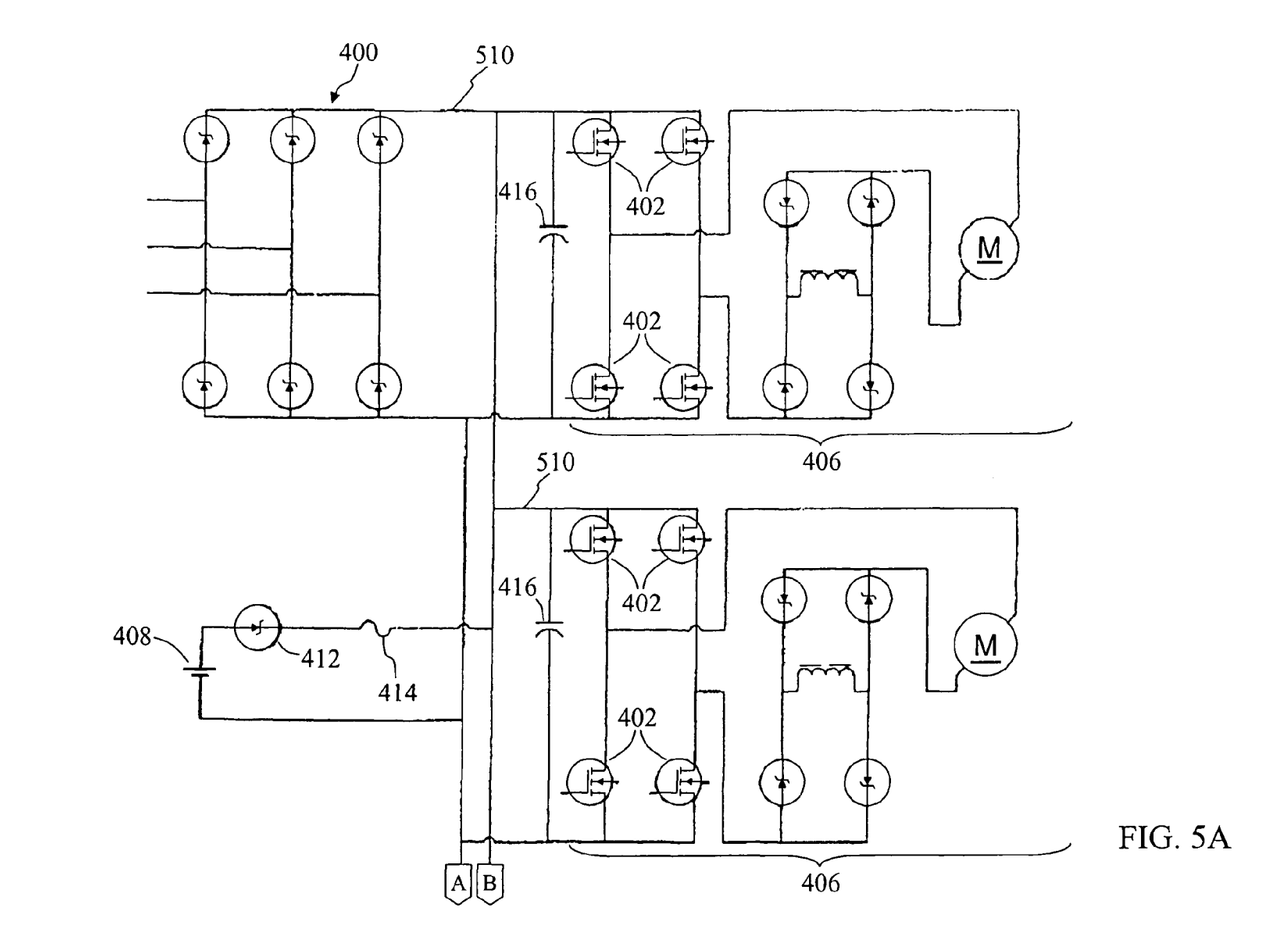
FIGS. 5A and 5B are a block schematic diagram representative of some configurations of the present invention for controlling a plurality of pitch control systems of a wind turbine using a non-regenerative source.
Figure 5B:
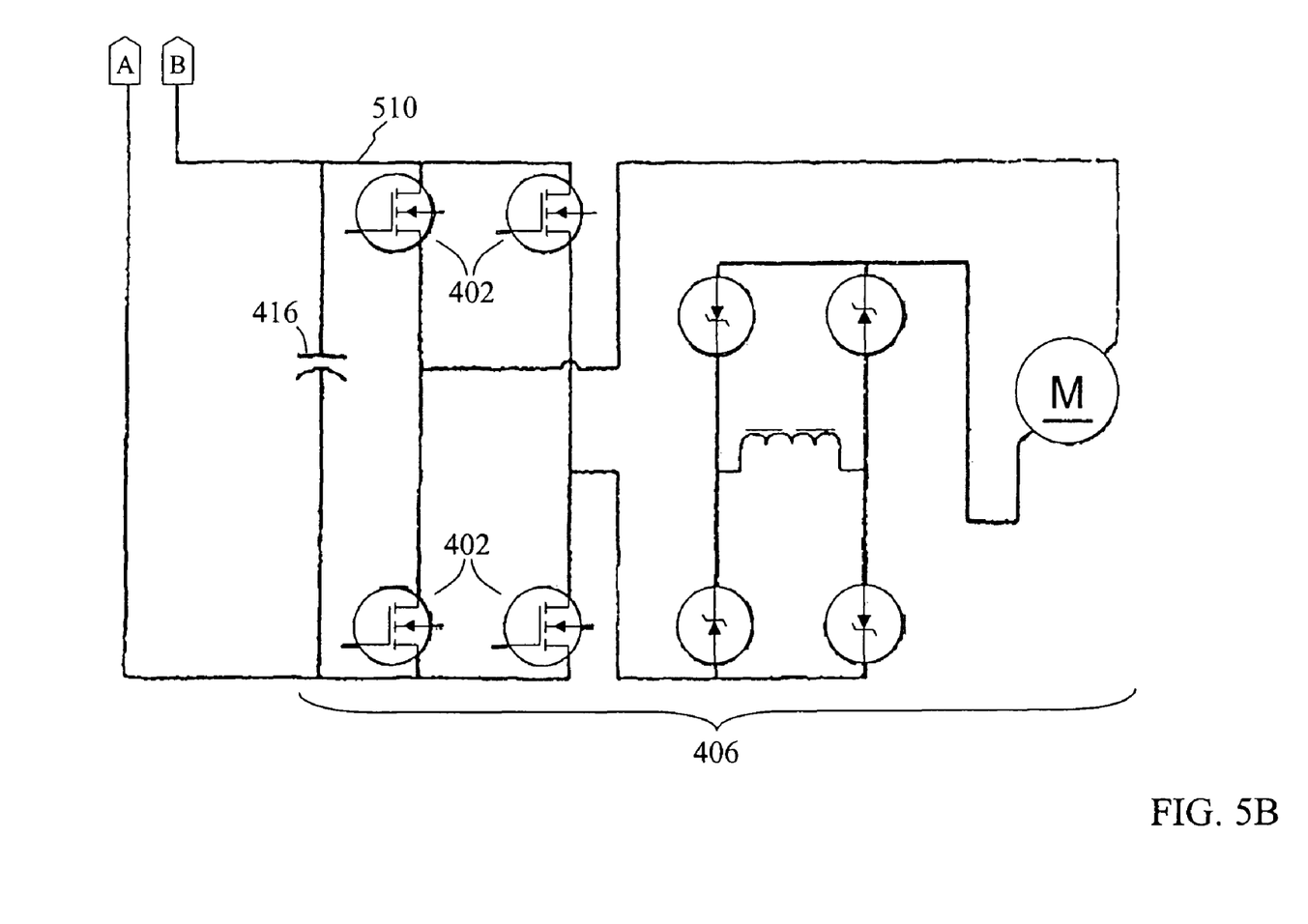
Figure 6A:
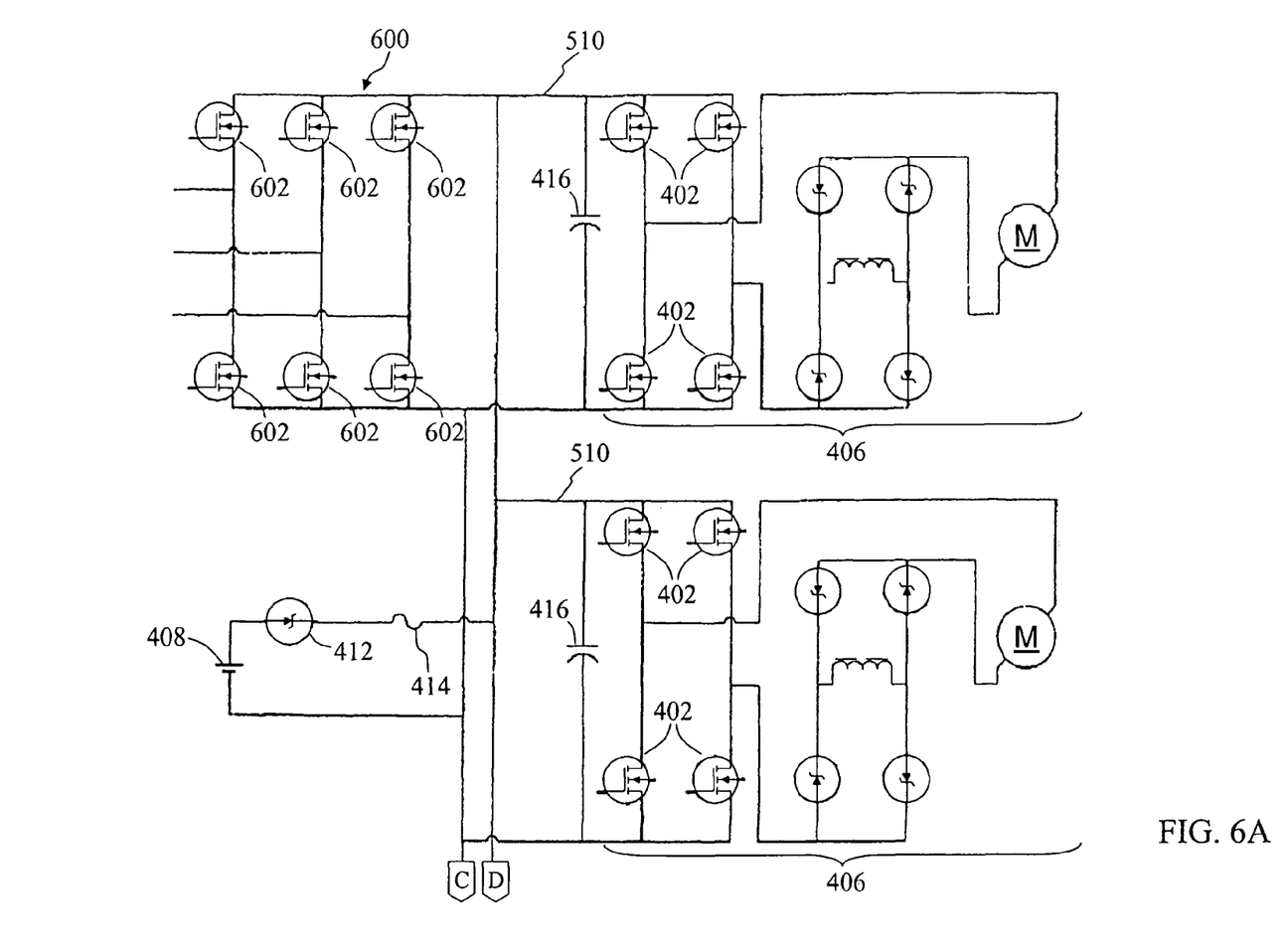
FIGS. 6A and 6B are a block diagram representative of some configurations of the present invention for controlling a plurality of pitch control systems of a wind turbine using a regenerative source.
Figure 6B:
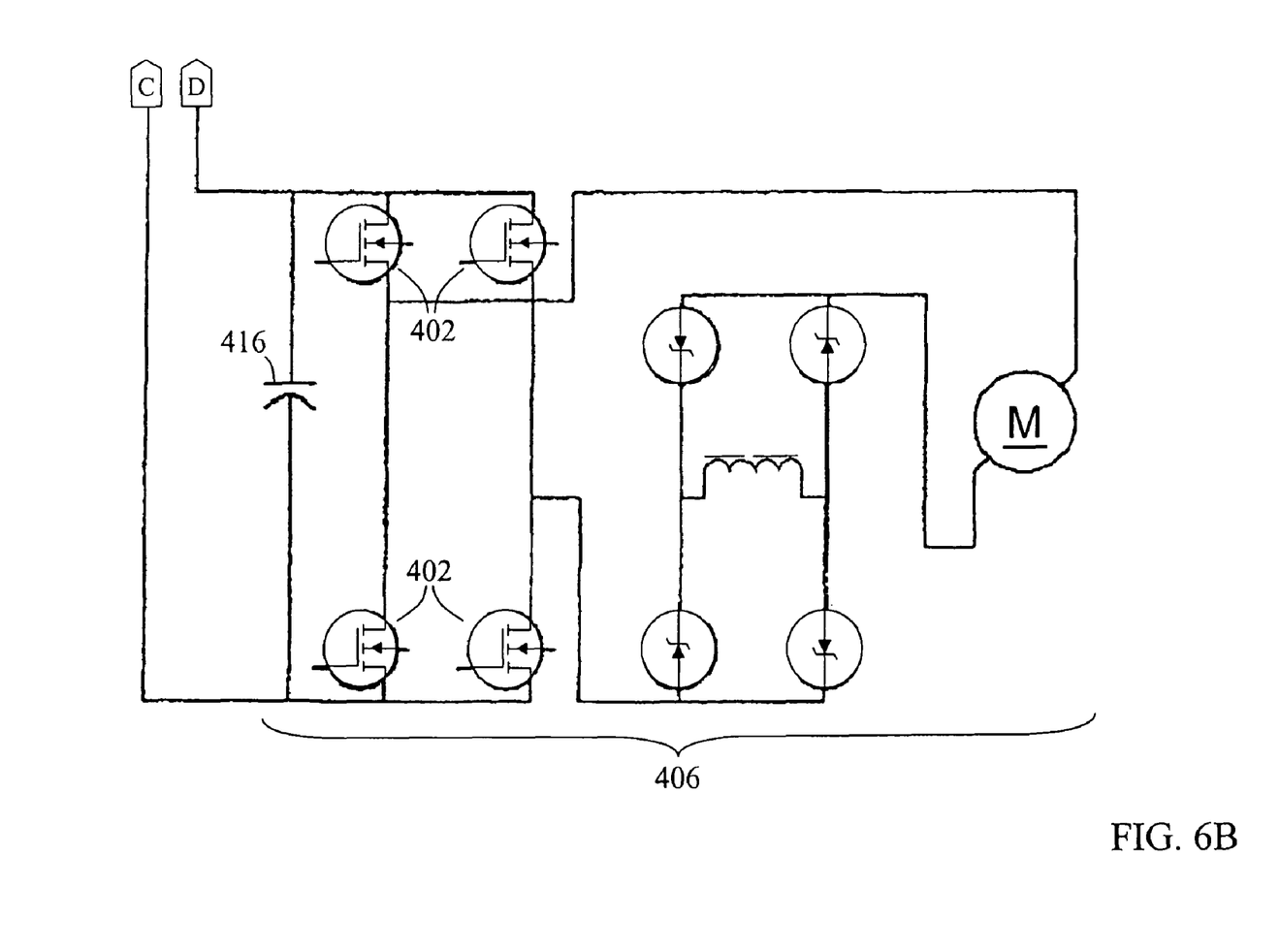

In some configurations of the present invention and referring to FIGS. 5A and 5B, a multi-drive wind turbine pitch control system is provided. One non-regenerative source 400 of AC power can supply multiple pitch control systems 406 using a common DC link 510. Common DC link 510 is supported by the use of a battery 408. In some configurations, pitch control systems 406 on common DC link 510 swap real power during operation and reduce power demand on battery 408 in the event of an AC power outage or dip. Also, in some configurations and referring to FIGS. 6A and 6B, pitch control systems 406 with a common DC link 510 supplied by a fully regenerative IGBT or MOSFET 602 controlled source 600. Battery 408 is used in this configuration to support DC link 510 in the event of power outages.

It will thus be appreciated that configurations of the present invention are able to provide battery supported operation of pitch control motor drives, which increases the availability of the wind turbine by allowing operation through grid disturbances.

Configurations of the present invention are not limited to wind turbines having any specific number of blades. For example, turbines with one, two, or three blades (or more) can use configurations of the present invention to control blade angle in the event of an AC power loss, therefore increasing turbine availability over those turbines that do not have DC link pitch control capability.

While the invention has been described in terms of various specific embodiments, those skilled in the art will recognize that the invention can be practiced with modification within the spirit and scope of the claims.

What is claimed is:

1. A method for controlling a pitch control system of a wind turbine, said method comprising:
   coupling an AC power source to a DC link including a DC capacitor, the AC power source configured to provide AC input power to the DC link;
   providing a charged backup battery configured to supply no energy to the DC link when full AC input power is available;
   using energy stored in the DC link capacitor to operate a pitch control system during a loss or dip of AC input power; and
   maintaining charge on the DC link capacitor using the charged backup battery as voltage across the DC link capacitor drops during operation of the pitch control system, wherein the AC power source remains coupled to the DC link when maintaining charge on the DC link capacitor.

2. A method in accordance with claim 1 wherein said providing a charged backup battery further comprises reverse biasing a diode in series with the backup battery so that, when full AC input power is available, the backup battery does not supply power to the DC link.

3. A method in accordance with claim 1 wherein said maintaining charge on the DC link capacitor further comprises discharging the backup battery through a forward biased diode and a fuse.

4. A method in accordance with claim 1 for controlling a plurality of pitch control systems of a wind turbine, further comprising supplying AC power from a non-regenerative source, and wherein the DC link is common to the plurality of pitch control systems, and further wherein
maintaining charge on the DC link capacitor using the charged backup battery further comprises supplying current from the backup battery to the common DC link.

5. A method in accordance with claim 4 further comprising swapping real power between the plurality of the pitch control systems during operation with full AC input power.

6. A method in accordance with claim 1 further comprising supplying AC input power from a fully regenerative IGBT or MOSFET controlled source.

7. A method in accordance with claim 6 for controlling a plurality of pitch control systems of a wind turbine, wherein said supplying power from the regenerative source comprises supplying the power off a DC link common to the plurality of pitch control systems; and further wherein
maintaining charge on the DC link capacitor using the charged backup battery further comprises supplying current from the backup battery to the common DC link.

8. A method in accordance with claim 7 further comprising swapping real power between the plurality of pitch motor drives during operation with full AC input power.

9. An apparatus for controlling pitch of a blade of a wind turbine, said apparatus comprising:
a pitch control system;
a DC link having a DC link capacitor and configured to provide power to said pitch control system;
a source of AC input power to provide power to said DC link; and
a backup battery configured to supply no energy to the DC link when full AC input power is available,
said apparatus configured to:
use energy stored in said DC link capacitor to operate said pitch control system during a loss or dip of AC input power; and
maintain charge on said DC link capacitor using said backup battery as voltage across said DC link capacitor drops during operation of said pitch control system, said source of AC input power remains coupled to said DC link when said backup battery maintains charge on said DC link capacitor.

10. An apparatus in accordance with claim 9 further comprising a diode, wherein said diode is reverse biased and in series with said backup battery so that, when full AC input power is available, said backup battery does not supply power to said DC link.

11. An apparatus in accordance with claim 9 further comprising a forward biased diode and a fuse, wherein to maintain charge on said DC link capacitor, said apparatus further configured to discharge said backup battery through said forward biased diode and said fuse.

12. An apparatus in accordance with claim 9 comprising a plurality of pitch control systems, said AC source being a non-regenerative source, and said DC link is common to a plurality of pitch motor systems; and further wherein
said maintaining charge on the DC link capacitor using the charged backup battery further comprises supplying current from the backup battery to the common DC link.

13. An apparatus in accordance with claim 12 further configured to swap real power between said plurality of pitch control systems during operation with full AC input power.

14. An apparatus in accordance with claim 9 wherein said source of AC input power comprises a fully regenerative IGBT or MOSFET controlled source.

15. An apparatus in accordance with claim 14 for controlling a multi-drive pitch control system of a wind turbine, wherein said apparatus comprises a plurality of pitch control systems, said DC link is common to said plurality of pitch control systems, and further wherein
to maintain charge on said DC link capacitor using said charged backup battery, said apparatus further configured to supply current from said backup battery to said common DC link.

16. An apparatus in accordance with claim 15 further configured to swap real power between said plurality of pitch control systems during operation with full AC input power.

17. A wind turbine comprising:
at least one blade and a generator coupled to said at least one blade and configured to generate AC power;
a pitch control system configured to control a pitch of said at least one blade about an axis;
a DC link having a DC link capacitor and configured to provide power to said pitch control system;
a source of AC input power to provide power to said DC link, said source of AC power not necessarily comprising said generator; and
a backup battery configured to supply no energy to said DC link when full AC input power is available, said wind turbine configured to:
use energy stored in said DC link capacitor to operate said pitch control system during a loss or dip of AC input power; and
maintain charge on said DC link capacitor using said backup battery as voltage across said DC link capacitor drops during operation of said pitch control system, said source of AC input power remains coupled to said DC link when said backup battery maintains charge on said DC link capacitor.

18. A wind turbine in accordance with claim 17 further comprising a diode, wherein said diode is reverse biased and in series with said backup battery when said backup battery is charged and full AC input power is available, so that, when said full AC input power is available, said backup battery does not supply power to said DC link, and further comprising a fuse, wherein to maintain charge on said DC link capacitor, said wind turbine further configured to forward bias said diode and to discharge said backup battery through said forward biased diode and said fuse.

19. A wind turbine in accordance with claim 17 comprising a plurality of pitch control systems, and wherein said DC link is common to said plurality of pitch motor systems; and to maintain charge on said DC link capacitor using the backup battery, said wind turbine further configured to supply current from the backup battery to the common DC link.

20. A wind turbine in accordance with claim 19 further configured to swap real power between the plurality of pitch control systems during operation of said wind turbine with full AC input power.

* * * * *